United States Patent [19]

Mangiavacchi et al.

[11] 4,279,528
[45] Jul. 21, 1981

[54] TULIP MEMBER FOR A TRIPOD JOINT AND PROCESS FOR PRODUCING THE SAME

[75] Inventors: Jacques Mangiavacchi, Chatou; Alain Chauvelot, Boisemont; Claude Dolain, Les Mureaux, all of France

[73] Assignee: Glaenzer Spicer, Poissy, France

[21] Appl. No.: 70,731

[22] Filed: Aug. 29, 1979

[30] Foreign Application Priority Data

Sep. 18, 1978 [FR] France ............................. 78 26713

[51] Int. Cl.³ .............................................. F16D 3/00
[52] U.S. Cl. ...................................... 403/57; 403/404; 64/21; 148/16.5; 148/16.6
[58] Field of Search ............... 403/57, 58, 404; 64/21; 148/16.5, 16.6

[56] References Cited

U.S. PATENT DOCUMENTS

| 2,367,978 | 1/1945 | Troy .................................... 148/16.6 |
| 3,298,200 | 1/1967 | Altmann et al. ...................... 64/21 |
| 4,134,701 | 1/1979 | McEowen ........................... 403/404 |
| 4,165,243 | 8/1979 | Sarnes et al. ...................... 148/16.5 |

FOREIGN PATENT DOCUMENTS 692161 8/1964 Canada .................................... 148/16.6

Primary Examiner—James Kee Chi
Attorney, Agent, or Firm—Schuyler, Banner, Birch, McKie & Beckett

[57] ABSTRACT

The object of this invention is to improve the performance of the tulip members in the regions of connection or attachment between the petal portions and the adjacent shaft, this result being obtained by simple means. For this purpose, whereas the rest of the member (the raceways, bottom, cavities for the attachment of members effecting an axial retention) is carburized or carbonitrided, the connection regions are substantially devoid of any carburizing or carbonitriding.

6 Claims, 4 Drawing Figures

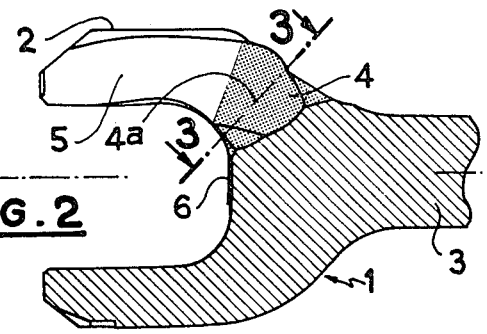
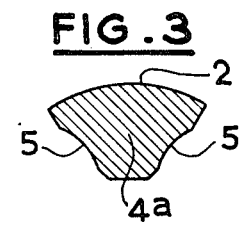
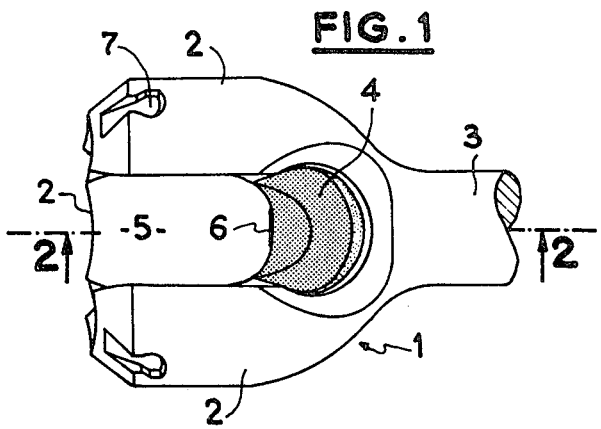
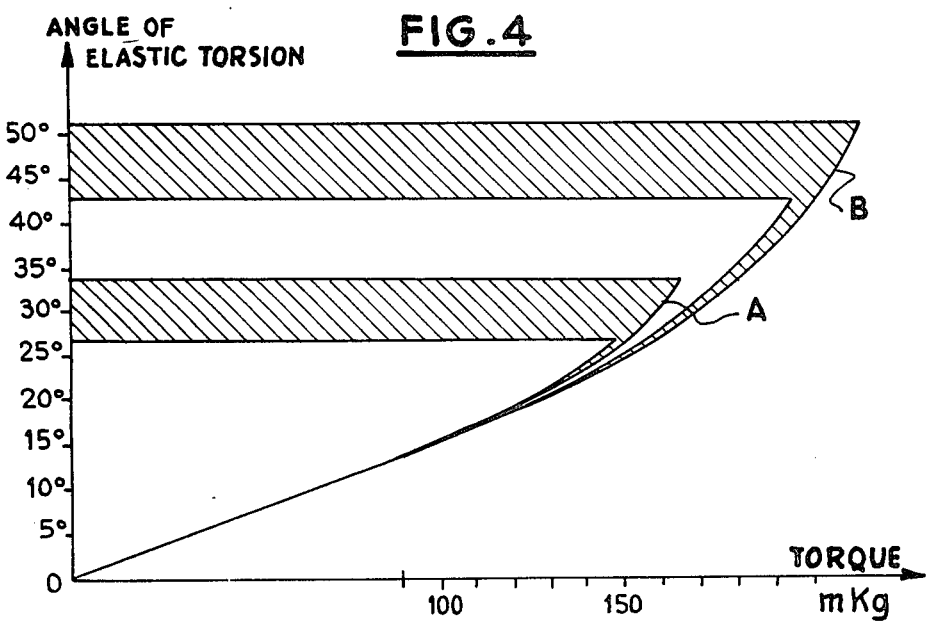

TULIP MEMBER FOR A TRIPOD JOINT AND PROCESS FOR PRODUCING THE SAME

DESCRIPTION

The present invention relates to members in the form of a tulip which constitute, in the example of application, one of the essential elements of tripod type homokinetic joints.

It is known that such joints are mainly constituted by a tripod member defining trunnions on which are rotatively and slidably mounted rollers received in raceways defined by a member in the shape of a tulip. This member comprises three petal portions each of which defines two raceways and is connected to a shaft by a connection or attachment region of reduced section whose bending-torsional strength determines the maximum allowable torque in the joint and consequently in the transmission. Further, bearing in mind that the raceways must have a high surface hardness, these tulip members are subjected to a heat treatment of carburizing or carbonitriding followed by a final quenching. Now, it has been found surprizingly since no phenomenon of fragility can be held responsible in this case, that although the carburizing or carbonitriding treatment increases to a considerable extent the resistance of the raceways to the pressures of contact of the rollers or other rolling bodies, it seems to have for effect to substantially reduce the resistance to the normal and tangential stresses developed in the course of the transmission of the torque in the connection or attachment regions of the petal portions.

This resulted in a limitation of the static fracture torque, which precludes the use of these joints at the maximum of their possibilities.

An object of the invention is to overcome this drawback and to improve the performance of the tulip portions in the regions of connection or attachment between the petal portions and the adjacent shaft, this result being obtained by simple means.

According to the invention, there is provided a tulip member for a tripod type or like joint, of the type comprising branches or petal portions which are connected by connection or attachment regions to an adjacent shaft and define raceways which are carburized or carbonitrided, wherein the metal constituting the tulip member is roughly devoid of any carburizing or carbonitriding in said connection or attachment regions.

According to a process for producing such a tulip member, prior to the usual treatment of the carburizing or carbonitriding, there is placed in position in the connection or attachment regions of the petal portions on the adjacent shaft a mask which is sufficiently impermeable to high temperature, this mask being formed by a varnish or like product or by metal members fitting and surrounding the shape of the regions concerned.

The invention will be described in more detail hereinafter with reference to the accompanying drawing given by way of example and in which:

FIG. 1 is a top plan view of a tulip member according to the invention;

FIG. 2 is a sectional view taken on line 2—2 of FIG. 1;

FIG. 3 is a sectional view taken on line 3—3 of FIG. 2, and

FIG. 4 is a graph illustrating the advantage resulting from this tulip member.

There is shown in the drawing (FIGS. 1 and 2) a tulip member 1 of a tripod-type homokinetic joint comprising three petal portions 2 which are connected to a transmission shaft 3 by connection or attachment regions 4. These petal portions also define in the known manner raceways 5 for rollers (not shown) which are part of the joint and are carried by a tripod member.

According to the invention, the connection or attachment regions 4, which are shown shaded and extend on each side of a critical section 4a (FIG. 3) having the smallest area, are constituted by the normal metal of the tulip member, for example a steel designated by the French Standard 27 CD 4, whereas the rest of the tulip member and the raceways 5, the bottom 6 of the cavity of the tulip member and the recesses 7 for the attachment of an axial retaining member (not shown) are constituted at least on the surface by a carburized or carbonitrided steel. Owing to this feature and in a rather surprizing manner, said attachment regions provide an improved resistance and an improved behaviour, as is illustrated in the graph of FIG. 4, in which the curves A and B represent the relationship between the transmitted torque and the angle of elastic torsion of the shaft for a representative population of a mass production, respectively for tulip members which have been uniformly carbonitrided or carburized throughout their surface and for tulip members according to the invention which are identical but in which the critical regions at the point of attachment of the petal portion are substantially devoid of carburizing or carbonitriding. It can be seen that this result is amazing, since the minimum transmissible torque increases from about 150 to 195 m/kg and the angle of elastic torsion increases from 30° to more than 45°.

In order to obtain such a result, prior to the carburizing or carbonitriding of the tulip member, there are placed in position in the attachment regions protective masks which may be constituted either by a varnish which resists high temperature or by metal members which fit the shape of these regions. The rest of the treatment is conventional, namely after the carburizing or carbonitriding, the whole of the member is subjected to a final quenching after the masks have been removed.

By way of example:

a steel employed for the production of such tulip members has the following composition:

French Standards designation: 27 CD 4:

carbon: 0.24 to 0.31%; manganese 0.6–0.85%;

chromimum: 0.95 to 1.25%; molybdenum 0.2–0.3%;

a treating process which may be employed is the following:

carbonitriding to a total depth of 0.5 mm carried out in a gaseous phase at 800° C. in a furnace. The surfaces surrounding the critical section are protected from this carbonitriding. Then, a direct quenching at the outlet of the furnace in an oil of known type, then a stress-relieving tempering between 140° and 160° C.;

a product employed for making the masks may be a varnish which resists high temperature designated by the trademark CONDURSAL.

Having now described our invention what we claim as new and desire to secure by Letters Patent is:

1. In a metal tulip member for a tripod type joint, the tulip member comprising a shaft, branches which are connected to the shaft in connection regions and define raceways; the improvement wherein the tulip member is completely carburized except in said connection regions, which regions are substantially devoid of any carburizing.

2. A process for producing a tulip member in particular for a tripod type joint, the tulip member comprising a shaft and branches which are connected to the shaft in connection regions and define raceways, the process comprising placing in position, in each of said connection regions, a masking means which is sufficiently impermeable to high temperature and thereafter effecting a carburizing treatment on the entire surface of the tulip member except in said regions masked by said masking means.

3. A process as claimed in claim 2 or 6, wherein said masking means comprises a varnish.

4. A process as claimed in claim 2 or 6, wherein said masking means comprises metal members which fit the shape of said regions to be masked.

5. In a metal tulip member for a tripod type joint, the tulip member comprising a shaft, branches which are connected to the shaft in connection regions and define raceways; the improvement wherein the tulip member is completely carbonitrided except in said connection regions, which regions are substantially devoid of any carbonitriding.

6. A process for producing a tulip member in particular for a tripod type joint, the tulip member comprising a shaft and branches which are connected to the shaft in connection regions and define raceways, the process comprising placing in position, in each of said connection regions, a masking means which is sufficiently impermeable to high temperature and thereafter effecting a carbonitriding treatment on the entire surface of the tulip member except in said regions masked by said masking means.

* * * * *